UNITED STATES PATENT OFFICE.

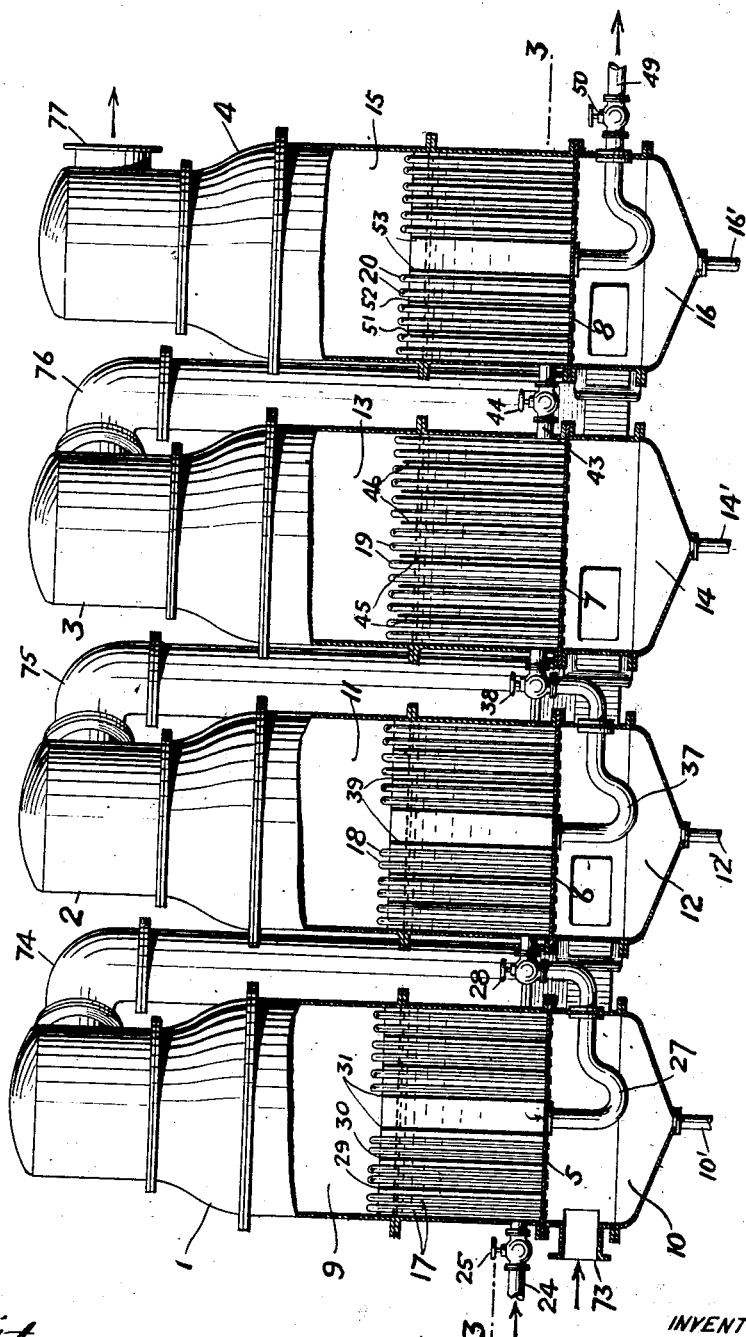

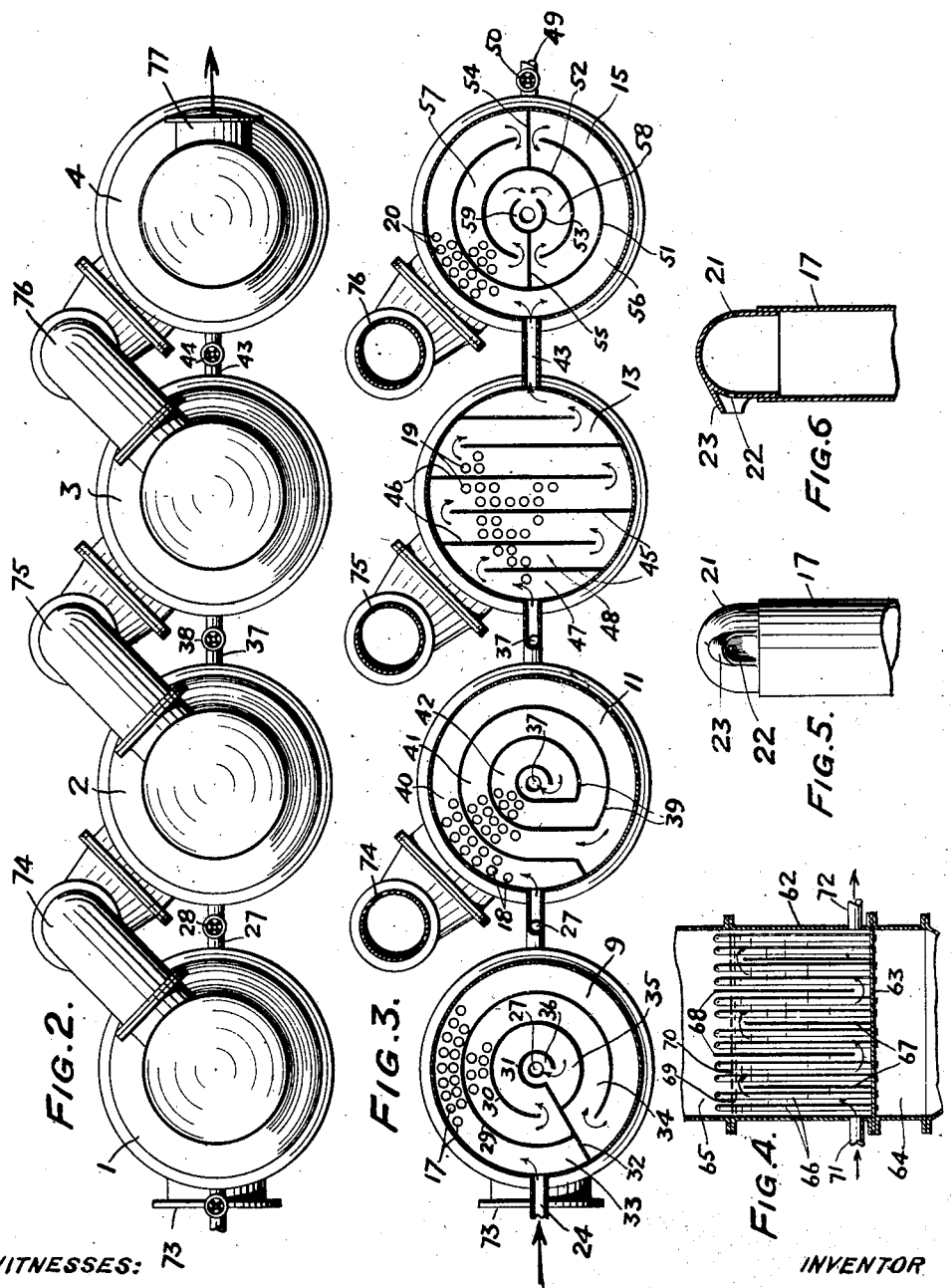

JOSEPH E. DUNN, OF PHILADELPHIA, PENNSYLVANIA.

EVAPORATOR.

1,033,558.   Specification of Letters Patent.   Patented July 23, 1912.

Application filed October 24, 1911. Serial No. 656,429.

*To all whom it may concern:*

Be it known that I, JOSEPH E. DUNN, a British subject, residing in the city of Philadelphia, county of Philadelphia, and State of Pennsylvania, have invented certain Improvements in Evaporators, of which the following is a specification.

My invention relates to evaporators for the reduction of sugar and other solutions to concentrated or solid form and my leading object is to provide improved means for circulating and heating the matter to be so reduced.

The characteristic features of my invention are disclosed in the following description and the accompanying drawings in illustration thereof.

In the drawings, Figure 1 is an elevation, part sectional, of apparatus embodying my improvements; Fig. 2 is a top plan view of the same; Fig. 3 is a sectional view taken on the line 3—3 of Fig. 1; Fig. 4 is a vertical sectional view taken through a part of a modified construction for circulating the solution; Fig. 5 is a side elevation of the top of one of the heating tubes, and Fig. 6 is a vertical sectional view of the top of the tube shown in Fig. 5.

The apparatus, as illustrated in Figs. 1, 2, and 3, comprises the shells 1, 2, 3, and 4 containing the respective sheets 5, 6, 7, and 8 respectively forming the top evaporating and bottom steam chambers 9 and 10 in the shell 1, 11 and 12 in the shell 2, 13 and 14 in the shell 3, and 15 and 16 in the shell 4. Heating tubes 17, 18, 19 and 20 have their lower open ends set in the respective sheets 5, 6, 7, and 8 so as to communicate with the steam chambers, and their upper ends, above the liquid space in the evaporating chambers, substantially closed by caps 21 containing lateral vents 22, the caps having the deflectors 23 extending over the vents, as illustrated in Figs. 5 and 6.

The evaporating chamber 9 has the pipe 24, containing the valve 25, connected therewith through the shell 1 for the introduction of the solution thereto, and the pipe 27, containing the valve 28, is connected with this chamber through the center of the sheet 5 and passes through the chamber 10 to carry away the concentrated product. Concentric baffles 29, 30 and 31, together with the radial baffle 32 connecting the alternate ends of the concentric baffles, extend upwardly from the sheet 5 and form the concentric passes 33, 34, 35 and 36 through which the solution introduced by the pipe 24 flows (in contact with heating tubes 17 extending upwardly through such passes), in reverse directions, to the central pass 36 and the discharge pipe 27, the tops of the baffles and the surface of the solution being below the vents 22.

The evaporating chamber 11 has the pipe 27 connected therewith through the shell 2, for the introduction of solution from the chamber 9, and the pipe 37, containing the valve 38, is connected with the chamber 11 through the central part of the sheet 6 and passes through the chamber 12 to discharge the concentrated solution from the second effect. A baffle 39, having the character of a distorted spiral, extends upwardly from the sheet 6 and forms a pass, comprising the convolutions 40, 41 and 42, through which the solution flows, in contact with the tubes 18, to the discharge pipe 37, the baffles and liquor surface in the chamber 11 being below the vents 22 in the tubes.

The evaporating chamber 13 has the pipe 37 connected therewith through the shell 3, for the introduction of the concentrated solution from the chamber 11, and the pipe 43, containing the valve 44, is connected with the chamber through the shell for the withdrawal of the product therefrom. Parallel baffles 45 and 46, rising from the sheet 7 and extending in opposite directions from the shell 3 part way across the chamber 13, form the connected oppositely extending passes 47 and 48 through which the concentrated solution, introduced by the pipe 37, flows in contact with the tubes 19 to the discharge pipe 43.

The evaporating chamber 15 receives the solution from the pipe 43 which is connected with the chamber through the shell 4, and the solution, further concentrated in this chamber, is discharged through the pipe 49, containing the valve 50, which is connected with the chamber through the center of the sheet 8 and passes through the chamber 16. Concentric baffles 51, 52 and 53, together with transversely disposed baffles 54 and 55, rise from the sheet 8 in the chamber 4 to form the connected passes 56, 57, 58 and 59 through which the solution flows, in contact with the tubes 20, from the pipe 43 to the discharge pipe 49 which delivers the product in finished form or to further apparatus.

The modified construction shown in Fig.

4, which can be substituted in, or used as a continuation of, the construction shown in Fig. 1, comprises a shell 62 containing a sheet 63 which forms two compartments 64 and 65. Tubes 66, having their open lower ends set in the sheet 63 so as to communicate with the chamber 64, rise in the chamber 65 to a plane above the liquor level. Baffles 67 extend across the chamber 65 and upwardly to terminals below the liquor level, while baffles 68 extend across this chamber from positions above the liquor surface to terminations above the sheet 63, thus forming the connected vertical passes 69 and 70 through which the solution flows from the pipe 71 to the pipe 72.

A pipe 73 communicates with the chamber 10; a pipe 74 connects the top of the chamber 9 with the chamber 12; a pipe 75 connects the top of the chamber 11 with the chamber 14; a pipe 76 connects the top of the chamber 13 with the chamber 16; and a discharge passage 77 is connected with the top of the chamber 15. Pipes 10', 12', 14' and 16' communicate with the bottoms of the respective chambers 10, 12, 14, and 16 to draw off water of condensation therefrom.

Steam is introduced through the pipe 73 to the chamber 10 and rises in the tubes 17 which are heated thereby, air in the tubes passing out through the top vents 22 beneath the deflectors 23 which reduce the suction that would otherwise obtain. Steam rising from the surface of solution flowing through the passes 33, 34 and 35 passes off through the pipe 74 to the chamber 12, and, rising in the tubes 18, heats liquor flowing through the passes 40, 41 and 42. The steam generated in this effect passes off through the pipe 75 to the chamber 14 and, rising in the tubes 19, heats liquor flowing through the passes 47 and 48, the latter liquor giving off steam which is carried off by the pipe 76 to heat liquor in the next effect and so on, the last effect of the series having an outlet 77 leading to the atmosphere or to a suitable condenser.

Having described my invention, I claim:

1. An evaporator comprising a shell containing a sheet forming an upper evaporating compartment and a lower steam compartment therein, heating tubes in said upper compartment having their lower ends set in said sheet so as to communicate with said lower compartment, said tubes having vents in the tops thereof and being exposed to solution in said evaporating compartment and means in said upper compartment for baffling solution therein.

2. An evaporator comprising a lower compartment for containing a heating fluid, an upper compartment for containing a solution to be evaporated, heating tubes in said upper compartment in communication with said lower compartment, said tubes having substantially closed ends with vents therein communicating with said upper compartment, and baffles in said upper compartment for controlling the movement of said solution in relation to said tubes.

3. An evaporating mechanism comprising a plurality of shells each containing a sheet forming an upper compartment for containing a solution to be evaporated and a lower compartment for containing a heating fluid, tubes in each of said upper compartments communicating with the respective lower compartments, baffles in each of said upper compartments for passing the solution in indirect courses in contact with said tubes, said tubes extending above said baffles and having vents in the tops thereof communicating with said upper compartments, a passage connecting upper compartments aforesaid whereby solution flows from one to the other, and a passage connecting the top of an upper compartment aforesaid with a lower compartment aforesaid.

4. An evaporator comprising a shell containing a sheet forming an upper and a lower compartment therein, tubes in said upper compartment having their lower ends set in said sheet in communication with said lower compartment, said tubes having closed tops with lateral vents therein, and means in said upper compartment for baffling the movement of solution in contact with said tubes.

5. An evaporator comprising an upper compartment for a solution to be evaporated and a lower compartment for a heating fluid, and tubes in said upper compartment in communication with said lower compartment, said tubes having vents in the upper ends thereof and means above said vents for baffling fluid discharged therefrom.

In witness whereof I have hereunto set my name this 19th day of October, 1911, in the presence of the subscribing witnesses.

J. E. DUNN.

Witnesses:
 Jos. G. Denny, Jr.,
 Robt. R. Kitchel.